US008947893B2

(12) United States Patent  
Kim et al.

(10) Patent No.: US 8,947,893 B2  
(45) Date of Patent: Feb. 3, 2015

(54) SWITCH CONTROLLER AND CONVERTER INCLUDING THE SAME FOR PREVENTION OF DAMAGE (75) Inventors: Jin-Tae Kim, Seoul (KR); Shanmei Li, Bucheon (KR); Jongmu Lee, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 312 days.

(21) Appl. No.: 13/293,378

(22) Filed: Nov. 10, 2011

(65) Prior Publication Data

US 2012/0120686 A1 May 17, 2012

(30) Foreign Application Priority Data

Nov. 11, 2010 (KR) .................. 10-2010-0112228  
Oct. 25, 2011 (KR) .................. 10-2011-0109511

(51) Int. Cl.  
 *H02M 3/335* (2006.01)

(52) U.S. Cl.  
 CPC .............................. *H02M 3/33507* (2013.01)  
 USPC ......................................................... 363/17

(58) Field of Classification Search  
 CPC .... H02M 1/32; H02M 3/33507; H02M 3/158  
 USPC ................. 363/21.01–21.18, 24, 97, 123; 361/93.1; 315/224, 291  
 See application file for complete search history.

(56) References Cited

U.S. PATENT DOCUMENTS

| | | | | |
|---|---|---|---|---|
| 6,433,491 | B2* | 8/2002 | Halberstadt | 363/123 |
| 7,339,287 | B2* | 3/2008 | Jepsen et al. | 307/82 |
| 7,436,127 | B2 | 10/2008 | Ribarich et al. | |
| 7,558,037 | B1* | 7/2009 | Gong et al. | 361/93.1 |
| 7,796,407 | B2* | 9/2010 | Yang | 363/21.06 |
| 2007/0096662 | A1 | 5/2007 | Ribarich et al. | |
| 2010/0019688 | A1* | 1/2010 | Choi et al. | 315/291 |
| 2010/0033998 | A1* | 2/2010 | Halberstadt | 363/97 |
| 2010/0157629 | A1* | 6/2010 | Yoshikawa | 363/21.01 |
| 2011/0175587 | A1* | 7/2011 | Hosotani | 323/283 |
| 2011/0176335 | A1* | 7/2011 | Li et al. | 363/21.02 |
| 2012/0181945 | A1* | 7/2012 | Storm | 315/224 |

OTHER PUBLICATIONS

Datasheet, "L6591 PWM controller for ZVS half-bridge," STMicroelectronics, Jun. 2008.*  
Datasheet, "MC34067, MC33067 High Performance Resonant Mode Controllers," ON Semiconductor, Jan. 2002.*  
"1MHz 150W Resonant Converter Design Review," Bill Andreycak, Texas Instruments, 2001.*

* cited by examiner

*Primary Examiner* — Adolf Berhane  
*Assistant Examiner* — Jye-June Lee  
(74) *Attorney, Agent, or Firm* — Okamoto & Benedicto LLP (57) ABSTRACT In a converter using a transformer, a switch controller controlling a main switch and an auxiliary switch increase a turn-on time of the auxiliary switch when a voltage of a signal corresponding to a current flowing to a primary coil of the transformer is greater than a reference voltage for a predetermined period.

21 Claims, 10 Drawing Sheets

SWITCH CONTROLLER AND CONVERTER INCLUDING THE SAME FOR PREVENTION OF DAMAGE

CROSS-REFERENCE TO RELATED APPLICATION

This application claims priority to and the benefit of Korean Patent Application No. 10-2010-0112228 filed in the Korean Intellectual Property Office on Nov. 11, 2010 and Korean Patent Application No. 10-2011-0109511 filed in the Korean Intellectual Property Office on Oct. 25, 2011, the entire contents of both of which are incorporated herein by reference.

BACKGROUND (a) Field

The present invention relates to a switch controller and a converter including the same.

(b) Description of the Related Art

A soft switching converter uses a capacitor that is coupled in series or parallel to a main transformer for transforming power of a primary coil and transmitting it to a secondary coil. The soft switching converter controls switching operations of power switches according to resonance between the inductor of the main transformer and the capacitor. Then, zero voltage switching or zero current switching is performed to enable a soft switching operation.

In general, in the startup or burst mode operation of the converter, the switching operation of the power switches may fail in zero voltage switching, or a shoot-through current may occur by the switching operation of the power switches because a magnetizing current of the main transformer becomes unstable by a capacitor. The shoot-through current is generated at the main switch and an auxiliary switch when the main switch for supplying power to the primary coil of the converter and the auxiliary switch for transmitting the supplied power to the secondary coil are turned on.

Failure of zero voltage switching or the shoot-through current generates a steep rise of current and noise. The steep rise of current damages components of the converter such as a metal-oxide semiconductor field-effect transistor (MOSFET) that is a power switch.

The above information disclosed in this Background section is only for enhancement of understanding of the background of the invention and therefore it may contain information that does not form the prior art that is already known in this country to a person of ordinary skill in the art.

SUMMARY OF THE INVENTION

An embodiment of the present invention provides a switch controller for preventing a converter from being damaged by failure of shoot-through or zero voltage switching, and a converter including the same.

An exemplary embodiment of the present invention provides a device including a main switch and an auxiliary switch and controlling the main switch and the auxiliary switch in a converter for generating an output voltage by using a transformer.

A switch controller includes an oscillator, a duty controller, and a gate driver.

The oscillator generates an oscillator signal.

The duty controller generates a duty signal for controlling switching operations of the main switch and the auxiliary switch by using the oscillator signal, and a result of comparing a signal corresponding to a primary coil current flowing at a primary coil of the transformer and a predetermined reference voltage, and a result of comparing a feedback voltage corresponding to the output voltage and the signal corresponding to the primary coil current.

The gate driver generates first and second control signals for controlling switching operations of the main switch and the auxiliary switch by using the duty signal.

Another exemplary embodiment of the present invention provides a converter including a main switch, an auxiliary switch, a transformer, and a switch controller.

The main switch performs a switching operation in response to a first control signal.

The auxiliary switch, connected between the main switch and a ground, performs a switching operation in response to a second control signal having a different phase from the first control signal.

The transformer includes a primary coil and a secondary coil connected to an output end, and transforms the input voltage into an output voltage by the switching operations of the main switch and the auxiliary switch.

The switch controller generates the first control signal and the second control signal by using a feedback voltage corresponding to the output voltage and a voltage of a signal corresponding to a current flowing to the primary coil, and increases a turn-on time of the auxiliary switch when the voltage of a signal corresponding to a current flowing to the primary coil is greater than a reference voltage.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, in addition, unless explicitly described to the contrary, the word "comprise" and variations such as "comprises" or "comprising" will be understood to imply the inclusion of stated elements but not the exclusion of any other elements. When it is described that an element is "coupled" to another element, the element may be "directly coupled" to the other element or "electrically coupled" to the other element through a third element.

A switch controller and a converter including the same according to an exemplary embodiment of the present invention will now be described with reference to accompanying drawings.

Figure 1:
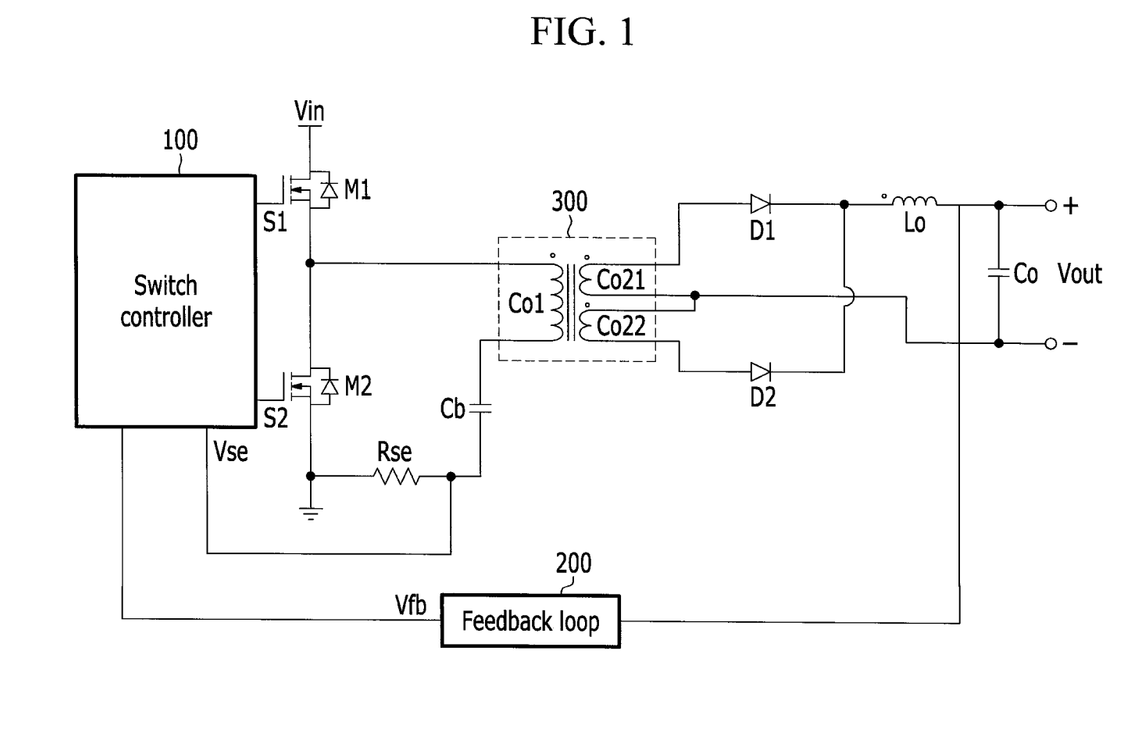
FIG. 1 shows a converter according to an exemplary embodiment of the present invention.

FIG. 1 shows a converter according to an exemplary embodiment of the present invention.

Referring to FIG. 1, a converter 10 includes a main switch M1, an auxiliary switch M2, a switch controller 100, a feedback loop 200, a transformer 300, a blocking capacitor (Cb), output diodes (D1) and (D2), an inductor (Lo), and a capacitor (Co).

Here, the transistors M1 and M2 are switches including a control terminal, an input terminal, and an output terminal, respectively. FIG. 1 shows n-channel field effect transistors (FET) for the transistors M1 and M2, and in this case, the control terminal, the input terminal, and the output terminal correspond to a gate, a drain, and a source, respectively. A body diode (not shown) can be formed to the transistors M1 and M2. Also, other transistors performing a similar function of the n-channel FET can be used for the transistors M1 and M2. For example, the transistors M1 and M2 can use IGBTs.

The drain of the main switch M1 is connected to a power supply for supplying an input voltage Vin, the source of the main switch M1 is connected to a drain of the auxiliary switch M2, and a source of the auxiliary switch M2 is grounded. The gates of the main switch M1 and the auxiliary switch M2 are connected to the switch controller 100, and the main switch M1 and the auxiliary switch M2 perform switching by control signals S1 and S2 output by the switch controller 100. The switch controller 100 alternately turns on/off the main switch M1 and the auxiliary switch M2.

The transformer 300 includes a primary coil Co1 and secondary coils Co21 and Co22. A first end of the primary coil Co1 is connected between the source of the main switch M1 and the drain of the auxiliary switch M2, and a second end of the primary coil Co1 is connected to a first end of the blocking capacitor (Cb). A first end of the secondary coil Co21 is connected to an anode of the output diode D1 and a second end of the secondary coil Co21 is connected to the first end of the secondary coil Co22 and an output end (−). The second end of the secondary coil Co22 is connected to an anode of the output diode D2.

A second end of the blocking capacitor (Cb) is connected a first end of the resistor (Rse) and the switch controller 100, and a second end of the resistor (Rse) is grounded.

A cathode of the output diode D1 and a cathode of the output diode D2 are connected to a first end of the inductor (Lo) and a second end of the inductor (Lo) is connected to the output end (+). The capacitor (Co) is connected between the two output ends (+, −). In this instance, the inductor (Lo) and the capacitor (Co) form an LC filter for removing the ripple component of the output voltage (Vout).

The feedback loop 200 transmits a feedback voltage Vfb corresponding to the output voltage (Vout) to the switch controller 100.

The switch controller 100 uses the feedback voltage Vfb and a voltage (Vse, a sense voltage hereinafter) of a detection signal corresponding to a flow to the primary coil Co1 to control a duty ratio of the control signals S1 and S2, and outputs the control signals S1 and S2 to the gates of the main switch M1 and the auxiliary switch M2.

An operation of the converter 10 will now be described with reference to FIG. 2 and FIG. 3A to FIG. 3D.

Figure 2:
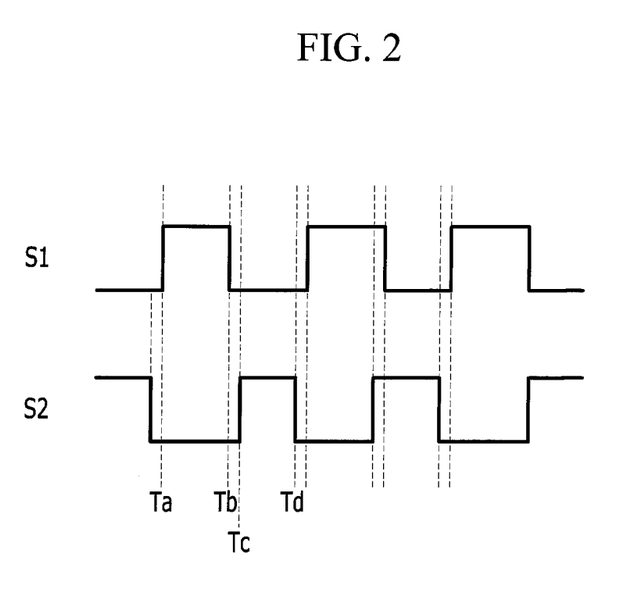
FIG. 2 shows a signal timing diagram of a converter shown in FIG. 1.

FIG. 2 shows a signal timing diagram of a converter shown in FIG. 1, and FIG. 3A to FIG. 3D show a current path according to the signal timing diagram of FIG. 2, respectively.

FIG. 2 shows voltages of the control signal S1 and S2 applied to the gates of the main switch M1 and the auxiliary switch M2. The main switch M1 and the auxiliary switch M2 are turned on by the high-level control signals S1 and S2, and they are turned off by the low-level control signals S1 and S2.

Referring to FIG. 2, the control signal S1 becomes high after a predetermined dead time starting from the time when the control signal S2 becomes low.

Figure 3A:
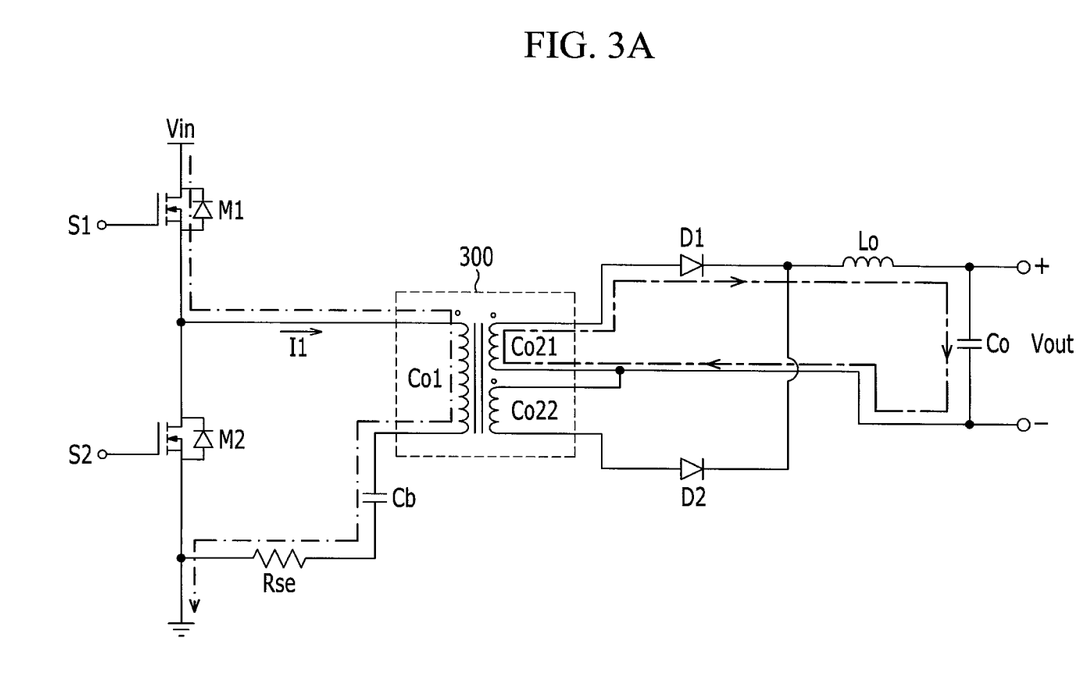
FIG. 3A to FIG. 3D show a current path according to the signal timing diagram of FIG. 2, respectively.

The main switch M1 is turned on at the time (Ta) when the control signal becomes high level S1. In this instance, the auxiliary switch M2 is turned off. Then, as shown in FIG. 3A, a current I1 of the primary coil flows through the main switch M1, the primary coil Co1, the blocking capacitor (Cb), the resistor (Rse), and the ground end. The voltage at the primary coil Co1 is transmitted to the secondary coils Co21 and Co22 according to a turn ratio of the primary coil Co1 versus secondary coils Co21 and Co22. The output diode D1 is turned on by the voltage at the secondary coil Co21, and a current at the secondary coil Co21 generated by the current I1 of the primary coil is transmitted to the capacitor (Co) through the output diode D1. In this instance, the voltage charged in the capacitor (Co) becomes an output voltage (Vout).

Figure 3B:
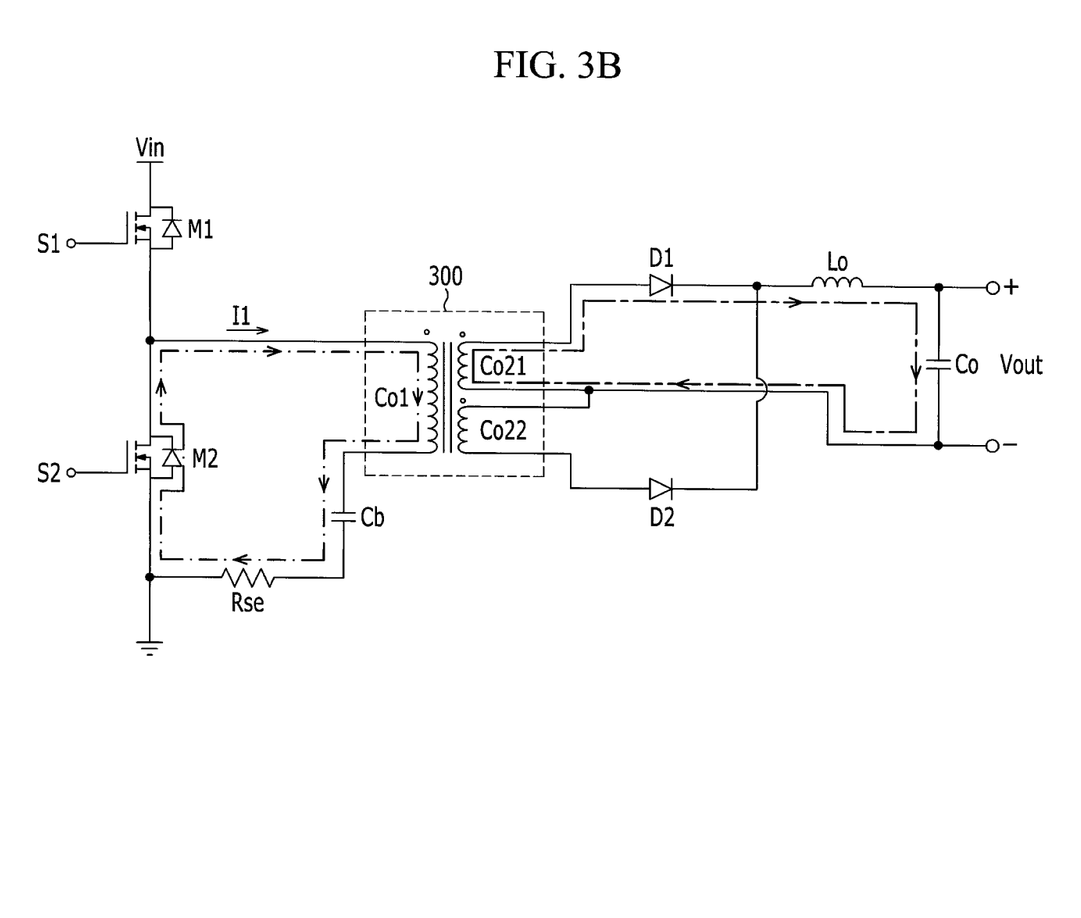

Next, the main switch M1 is turned off at the time (Tb) when the control signal S1 becomes low. That is, the main switch M1 and the auxiliary switch M2 are turned off during the period (Tb-Tc). As shown in FIG. 3B, a voltage at a parasitic capacitor (not shown) of the auxiliary switch M2 is discharged so the voltage at the auxiliary switch M2 becomes 0V, and the current I1 at the primary coil flows through the body diode of the auxiliary switch M2 and the current I1 is reduced during the period (Tb-Tc). The auxiliary switch M2 can perform zero voltage switching.

The control signal S2 becomes high after a predetermined dead time starting from the time (Tb) when the control signal S1 becomes low.

Figure 3C:
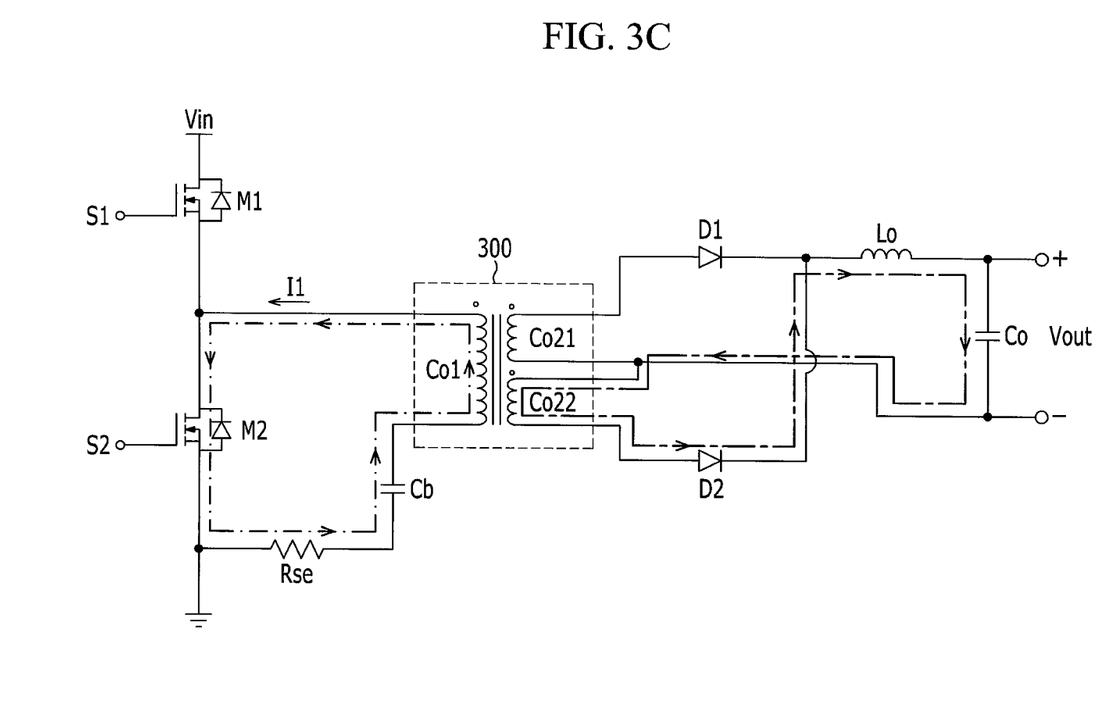

The auxiliary switch M2 is turned on at the time (Tc) when the control signal S2 becomes high. As shown in FIG. 3C, the current I1 of the primary coil flows to the auxiliary switch M2, the resistor (Rse), the blocking capacitor (Cb), and the primary coil Co1. The voltage at the primary coil Co1 is transmitted to the secondary coils Co21 and Co22 according to the turn ratio of the primary coil Co1 versus the secondary coils Co21 and Co22. The output diode D2 is turned on by the voltage at the secondary coil Co22 and the current at the secondary coil Co22 generated by the primary coil current I1 is transmitted to the capacitor (Co) through the output diode D2. In this instance, the voltage charged in the capacitor (Co) becomes the output voltage (Vout).

Figure 3D:
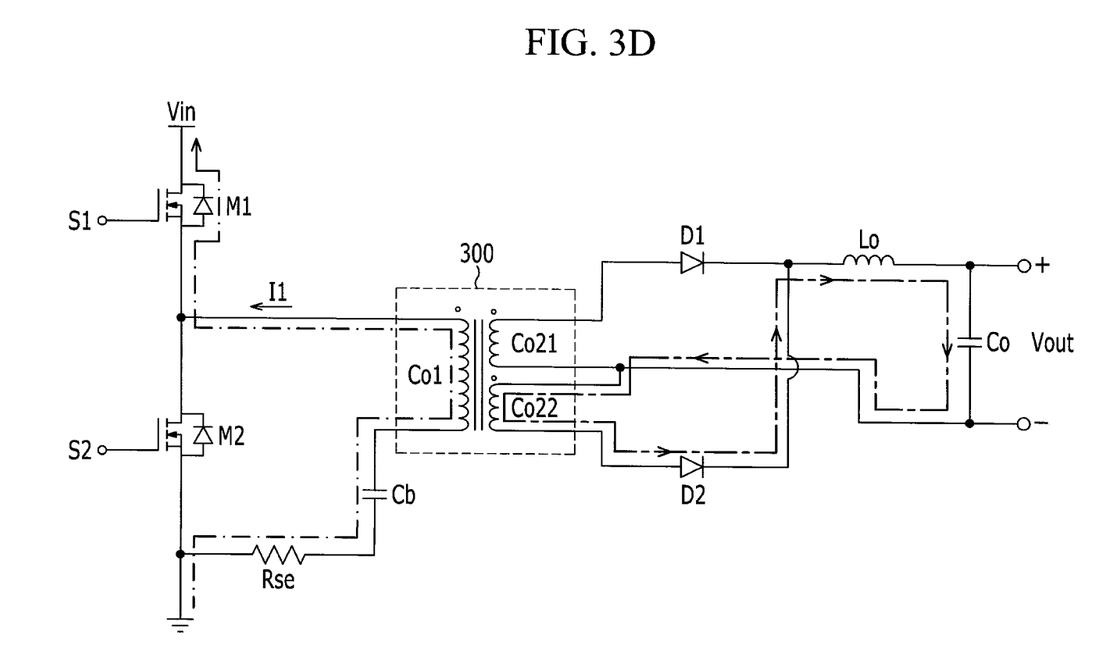

The auxiliary switch M2 is turned off at the time (Td) when the control signal S2 becomes low. That is, the main switch M1 and the auxiliary switch M2 are turned off during the period (Tc-Td). As shown in FIG. 3D, the voltage at the parasitic capacitor (not shown) of the main switch M1 is discharged so the voltage at the main switch M1 becomes 0V, and the current I1 at the primary coil starts to flow through the body diode of the main switch M1 and the current I1 is reduced during the period (Tc-Td). The main switch M1 can undergo zero voltage switching.

Accordingly, the converter 10 generates the output voltage (Vout) supplied to a load by using the current I1 at the primary coil generated by the switching operation of the main switch M1 and the auxiliary switch M2.

The converter 10 may generate a shoot-through current flowing to the main switch M1 and the auxiliary switch M2 without changing the current direction after the auxiliary switch M2 is turned on by the current I1 at the primary coil during the period (Ta).

A method for preventing failure of zero voltage switching or generation of the shoot-through current will now be described with reference to FIG. 4 to FIG. 7.

Figure 4:
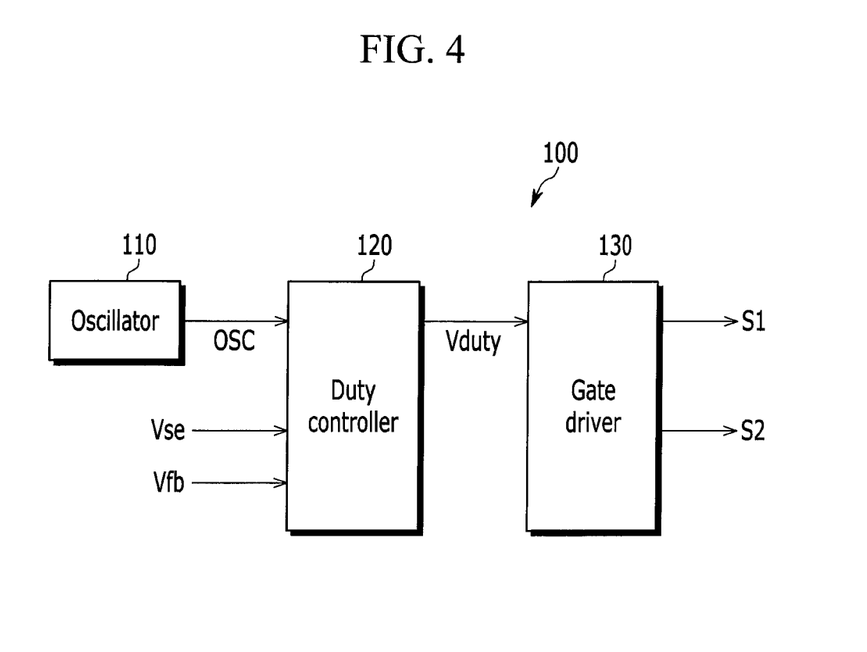
FIG. 4 shows a block diagram of a switch controller shown in FIG. 1.
Figure 5:
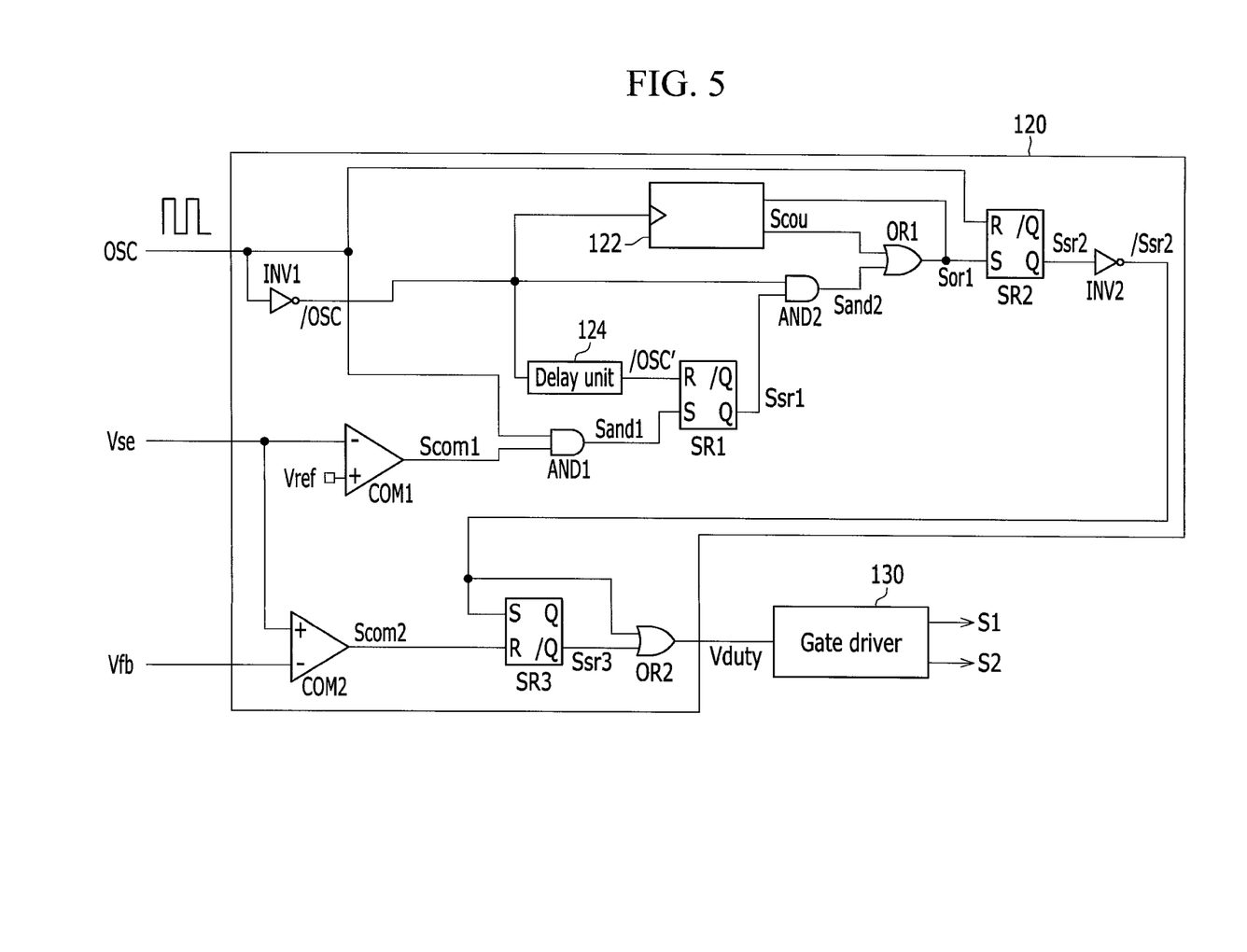
FIG. 5 shows a block diagram of a duty controller shown in FIG. 4.

FIG. 4 shows a block diagram of a switch controller shown in FIG. 1, and FIG. 5 shows a block diagram of a duty controller shown in FIG. 4.

Referring to FIG. 4, the switch controller 100 includes an oscillator 110, a duty controller 120, and a gate driver 130.

The oscillator 110 generates an oscillator signal (OSC) and outputs the same to the duty controller 120.

The duty controller 120 uses the oscillator signal (OSC), the sense voltage (Vse) corresponding to the current I1 at the primary coil, and the feedback voltage Vfb to generate a duty signal (Vduty).

In detail, the duty controller 120 turns off the main switch M1 and turns on the auxiliary switch M2 when the sense voltage (Vse) corresponds to the feedback voltage. In this instance, the main switch M1 is turned off, and the auxiliary switch M2 is turned on after a predetermined dead time.

Also, when the sense voltage (Vse) is less than a reference voltage (e.g., 0V) at a rising edge or falling edge of the oscillator signal (OSC), the duty controller 120 turns off the auxiliary switch M2 and turns on the main switch M1. In this instance, the auxiliary switch M2 is turned off, and the main switch M1 is turned on after a predetermined dead time.

The duty controller 120 sets a maximum turn-on duration of the auxiliary switch M2, and when the sense voltage (Vse) is maintained greater than the reference voltage, the duty controller 120 turns on the auxiliary switch M2 during the maximum turn-on duration and turns off the auxiliary switch M2. That is, when the sense voltage (Vse) keeps being greater than the reference voltage, the duty controller 120 increases the turn-on time of the auxiliary switch M2 so that the shoot-through current may not occur.

The gate driver 130 generates control signals S1 and S2 for controlling turn on/off of the main switch M1 and the auxiliary switch M2 according to the duty signal (Vduty). For example, the gate driver 130 can generate a control signal S1 for turning on the main switch M1 in synchronization with the falling edge of the duty signal (Vduty) and turning off the main switch M1 in synchronization with the rising edge of the duty signal (Vduty). In this instance, the gate driver 130 generates a control signal S2 for turning on the auxiliary switch M2 in synchronization with the rising edge of the duty signal (Vduty) and turning off the auxiliary switch M2 in synchronization with the falling edge of the duty signal (Vduty).

Referring to FIG. 5, the duty controller 120 includes comparators COM1 and COM2, an up-down counter 122, AND gates AND1 and AND2, a delay unit 124, SR latches SR1, SR2, and SR3, OR gates OR1 and OR2, and inverters INV1 and INV2.

The inverter INV1 inverts the oscillator signal (OSC) and outputs the inverted oscillator signal (/OSC) to the SR latch SR1, the up-down counter 122, and the AND gate AND2.

The comparator COM1 receives the sense voltage (Vse) at the inverting terminal (−) and the reference voltage (Vref) at the non-inverting terminal (+), and outputs a pulse signal (Scom1) having the high level when the sense voltage (Vse) is less than the reference voltage (Vref) and having the low level when the sense voltage (Vse) is greater than the reference voltage (Vref). In this instance, the reference voltage (Vref) can be set to be 0V.

The comparator COM2 receives the sense voltage (Vse) at the non-inverting terminal (+) and the feedback voltage Vfb at the inverting terminal (−), and outputs a pulse signal (Scom2) having the high level when the sense voltage (Vse) is greater than the feedback voltage Vfb and having the low level when the sense voltage (Vse) is less than the feedback voltage Vfb. When to turn off the main switch M1 is determined from the pulse signal (Scom2).

The AND gate AND1 receives the oscillator signal (OSC) and the pulse signal (Scom1) that is the output signal of the comparator Com1, performs an AND operation on the two signals (Sref and Scom1), and outputs the result to the SR latch SR1. The AND gate AND1 outputs a pulse signal (Sand1) that has the high level when the oscillator signal (OSC) and the pulse signal Scom1 have the high level.

The delay circuit 124 delays the inverted oscillator signal (/OSC) for a predetermined delay Td1, and output a delayed inverted oscillator signal (/OSC').

The SR latch SR1 includes a reset terminal (R) for receiving the delayed inverted oscillator signal (/OSC'), a set terminal (S) for receiving a pulse signal (Sand1) that is the output signal of the AND gate AND1, and an output terminal (Q) connected to the AND gate ADN2. The SR latch SR1 outputs the high level in synchronization with the rising edge of the pulse signal (Sand1) that is input to the set terminal (S), and outputs the low level in synchronization with the rising edge of the delayed inverted oscillator signal (/OSC') that is input to the reset terminal (R).

That is, the SR latch SR1 latches the high-level pulse signal (Sand1)) to generate a high-level pulse signal Ssr1, and resets the pulse signal (Sand1) to be the low level in synchronization with the rising edge of the delayed inverted oscillator signal (/OSC').

The AND gate AND2 receives the inverted oscillator signal (/OSC) and the pulse signal Ssr1 that is the output signal of the SR latch SR1 to perform an AND operation on the two signals (/Sref and Ssr1) and output the result to the OR gate OR1. The AND gate AND2 outputs the high-level pulse signal Ssr1 when the inverted oscillator signal (/OSC) and the pulse signal Ssr1 are high.

The OR gate OR1 receives the pulse signal (Scou) of the up-down counter 122 and the pulse signal (Sand2) that is the output signal of the AND gate AND2, performs an OR operation on the two signals (Scou, Sand2), and outputs the result. The OR gate OR1 outputs the low-level pulse signal Sor1 when the pulse signal (Scou) of the up-down counter 122 and the pulse signal (Sand2) are low.

The up-down counter 122 increases a count in synchronization with the inverted oscillator signal (/OSC), outputs a pulse signal (Scou) for resetting the count when the count value is greater than a predetermined value, and resets the count value in response to the pulse signal (Sand2) of the OR gate OR1. In this instance, the auxiliary switch M2 is turned off corresponding to the pulse signal (Scou). For example, when the predetermined value is set to be 4, the up-down counter 122 outputs the high-level pulse signal (Scou) when the count value is greater than 4, and resets the count value in response to the pulse signal (Sand2) of the OR gate OR1 with the high level in response to the high-level pulse signal (Scou).

The up-down counter 122 sets the maximum turn-on duration of the auxiliary switch M2, and the maximum turn-on duration of the auxiliary switch M2 can be set from a time when the count value is reset to a time when the pulse signal (Scou) is output.

The SR latch SR2 includes a reset terminal (R) for receiving the oscillator signal (OSC), a set terminal (S) for receiving the pulse signal Sor1 that is the output signal of the OR gate OR1, and an output terminal (Q) connected to the set terminal (S) of the SR latch SR3 and the OR gate OR2 through the inverter INV2. The SR latch SR2 outputs a high level signal in synchronization with the rising edge of the pulse signal Sor1 that is input to the set terminal (S), and outputs a low level signal in synchronization with the rising edge of the oscillator signal (OSC) that is input to the reset terminal (R). That is, the SR latch SR2 latches the high-level pulse signal Sor1 to generate a high-level pulse signal Ssr2, and resets the pulse signal Ssr2 to be a low level signal in synchronization with the rising edge of the oscillator signal (OSC).

The inverter INV2 inverts the pulse signal Ssr2 that is the output signal of the SR latch SR2, and outputs the inverted pulse signal (/Ssr2) to the set terminal (S) of the SR latch SR3.

The SR latch SR3 includes a reset terminal (R) for receiving a pulse signal (Scom2) that is the output signal of the comparator (COM2), a set terminal (S) for receiving an inverted pulse signal (/Ssr2) that is the output signal of the inverted inverter INV2, and an inverted output terminal (/Q) connected to the OR gate OR2. The SR latch SR3 outputs a pulse signal Ssr3 having a low level in synchronization with the rising edge of the inverted pulse signal (/Ssr2) that is input to the set terminal (S) and having a high level in synchronization with the rising edge of the pulse signal (Scom2) that is input to the reset terminal (R).

The OR gate OR2 receives the inverted pulse signal (/Ssr2) and the pulse signal Ssr3 that is the output signal of the SR latch SR3, performs an OR operation on the two signals (/Ssr2, Ssr3) to generate a duty signal (Vduty), and outputs the result to the gate driver 130.

An operation of the duty controller 120 will now be described with reference to FIG. 6 and FIG. 7.

Figure 6:
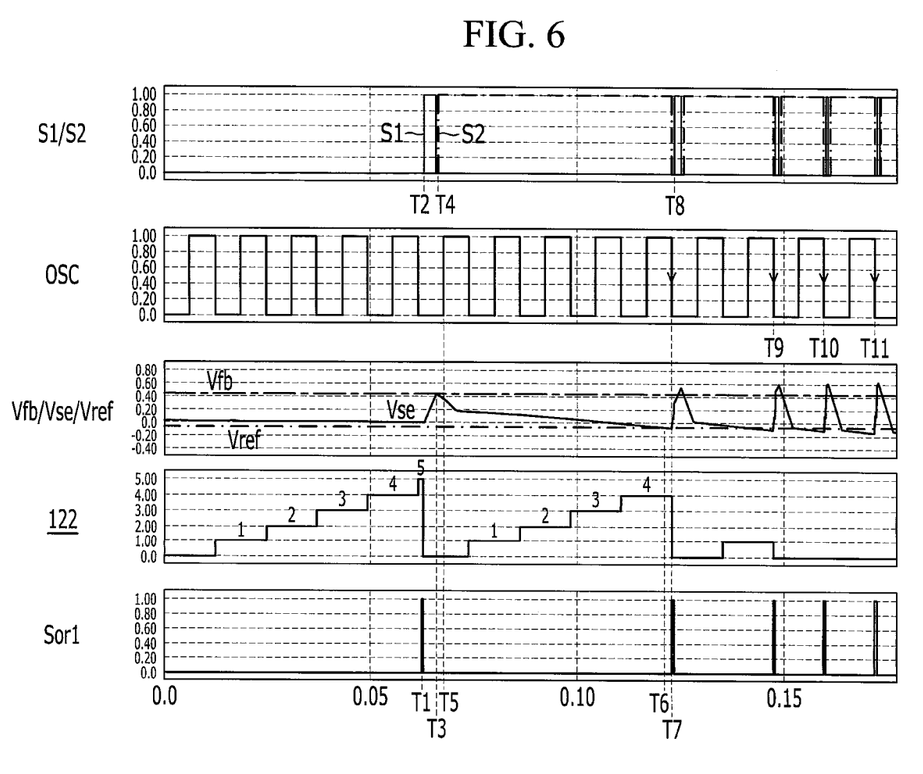
FIG. 6 shows an oscillator signal of an oscillator, a sense voltage, a reference voltage, an operational waveform of an up-down counter, and two control signals.
Figure 7:
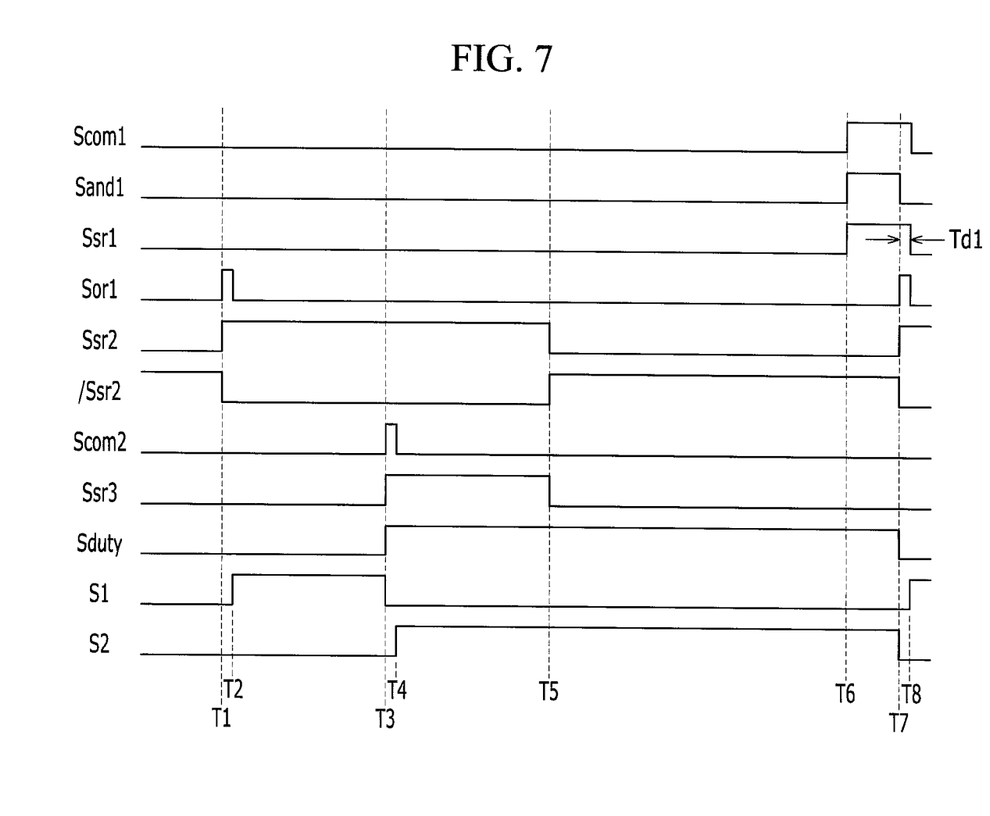
FIG. 7 shows an operational waveform of a duty controller.

FIG. 6 shows a reference pulse signal of an oscillator, a sense voltage, a reference voltage, an operational waveform of an up-down counter, and two control signals, and FIG. 7 shows an operational waveform of a duty controller.

Referring to FIG. 6 and FIG. 7, the sense voltage (Vse) is greater than the reference voltage (Vref) and is less than the feedback voltage Vfb until the period (before T1) when the count value of the up-down counter 122 reaches a predetermined value. Therefore, the pulse signal (Scom1) becomes low, and a low-level pulse signal (Sand) is output. The pulse signal (Scom1) maintains the low level until the time T6 when the sense voltage (Vse) becomes less than the reference voltage (Vref) so the pulse signal (Sand1) maintains the low level until the time T6.

The low-level pulse signal (Sand1) is input to the set terminal (S) of the SR latch SR1 until the time T6, and the delayed inverted oscillator signal (/OSC') is input to the reset terminal (R) of the SR latch SR1 so the pulse signal Ssr1 is maintained at the low level until the time T6.

That is, the low-level pulse signal (Scou) and the low-level pulse signal Sand 2 are input to the OR gate OR1 before the count value of the up-down counter 122 becomes greater than a predetermined value, so the low-level pulse signal Sor1 is input to the set terminal (S) of the SR latch SR2.

Therefore, the pulse signal Ssr2 is low before the time T1 so the high-level inverted pulse signal (/Ssr2) is input to the set terminal (S) of the SR latch SR3 and the OR gate OR2. The low-level pulse signal (Scom2) is input to the reset terminal (R) of the SR latch SR3 so the duty signal (Sduty) maintains the high level. Hence, the main switch M1 and the auxiliary switch M2 maintain the turn-off state.

The pulse signal Ssr2 becomes high since the high-level pulse signal (Scou) is input to the set terminal (S) of the SR latch SR2 at the time T1 when the count value becomes greater than the predetermined value. The pulse signal Ssr2 is maintained high until the time T5 when the oscillator signal (OSC) becomes high.

When the pulse signal Ssr2 becomes high, the low-level pulse signal (/Ssr2) is input to the set terminal (S) of the SR latch SR3 and the OR gate OR2. The low-level pulse signal (Scom2) is input to the reset terminal (R) of the SR latch SR3 so the duty signal (Sduty) becomes low. The main switch M1 is turned on at the time T2 after a predetermined dead time in response to the low level of the duty signal (Sduty).

When the main switch M1 is turned on, the sense voltage (Vse) starts to be increased as previously described.

At the time T3 when the sense voltage (Vse) becomes equal to the feedback voltage Vfb, the high-level pulse signal (Scom2) is input to the reset terminal (R) of the SR latch SR3 and the pulse signal Ssr2 is maintained at the high level, so the low-level pulse signal (/Ssr2) is input to the set terminal (S) of the SR latch SR3 and the OR gate OR2. The pulse signal Ssr3 becomes high and the duty signal (Sduty) becomes high. Therefore, the auxiliary switch M2 is turned on at the time T4 after a predetermined dead time in response to the high level of the duty signal (Sduty). Hence, the sense voltage (Vse) is reduced.

The pulse signal Ssr2 is low at the time T5 when the oscillator signal (OSC) becomes high, so the high-level inverted pulse signal (/Ssr2) is input to the set terminal (S) of the SR latch SR3 and the OR gate OR2. In this instance, the sense voltage (Vse) is less than the feedback voltage Vfb so the low-level pulse signal (Scom2) is input to the reset terminal (R) of the SR latch SR3. The low-level pulse signal Ssr3 is input to the OR gate OR2, and the duty signal (Sduty) maintains the high level. That is, the auxiliary switch M2 is maintains the turn-on state when the oscillator signal (OSC) becomes low.

At the time T6 when the sense voltage (Vse) becomes equal to the reference voltage (Vref), the pulse signal (Scom1) becomes high and the oscillator signal (OSC) becomes high so the pulse signal (Sand1) also becomes high. That is, the high-level pulse signal (Sand1) is input to the set terminal (S) of the SR latch SR1 and the low-level delayed inverted oscillator signal (/OSC') is input to the reset terminal (R) of the SR latch SR1 so the pulse signal Ssr1 becomes high.

Also, at the time T6, the low-level inverted oscillator signal (/OSC) and the high-level pulse signal Ssr1 are input to the AND gate AND2 so the pulse signal (Sand2) maintains the low level. The low-level pulse signal (Sand2) and the low-level pulse signal (Scou) are input to the OR gate OR1 so the pulse signal Sor1 maintains the low level. In this instance, the oscillator signal (OSC) has the high level so the pulse signal Ssr2 is low. Therefore, the high-level inverted pulse signal (/Ssr2) is input to the set terminal (S) of the SR latch SR3 and the OR gate OR2 so the duty signal (Sduty) maintains the high level that is the previous state.

The oscillator signal (OSC) becomes low at the time T7, and the pulse signal (Sand1) accordingly becomes low. The low-level pulse signal (Sand1) is input to the set terminal (S) of the SR latch SR1 and the low-level delayed inverted oscillator signal (/OSC') is input to the reset terminal (R) of the SR latch SR1, so the SR latch SR1 maintains the high-level pulse signal Ssr1 during the delay Td1.

The high-level pulse signal Ssr1 is input to the AND gate AND2. In this instance, the high-level inverted oscillator signal (/OSC) is input to the AND gate AND2, so the AND gate AND2 generates the high-level pulse signal (Sand2). The high-level pulse signal (Sand2) is input to the OR gate OR1, the pulse signal Sor1 becomes high. Hence, the count value of the up-down counter 122 is reset at the time T7. The delayed inverted oscillator signal (/OSC') becomes at the time T8, and the pulse signal Ssr1 becomes low level.

Further, the high-level pulse signal Sor1 is input to the set terminal (S) of the SR latch SR2 and the low-level oscillator signal (OSC) is input to the reset terminal (R) of the SR latch SR2 so the pulse signal Ssr2 becomes high and the low-level inverted pulse signal (/Ssr2) is input to the set terminal (S) of the SR latch SR3 and the OR gate OR2. The low-level pulse signal (Scom2) is input to the reset terminal (R) of the SR latch SR3 so the SR latch SR3 maintains the previous state. That is, the low-level pulse signal Ssr3 and the low-level pulse signal (/Ssr2) are input to the OR gate OR2 so the duty signal (Sduty) becomes low. The auxiliary switch M2 is turned off in response to the low level of the duty signal (Sduty), and the main switch M1 is turned on at the time T8 after a predetermined dead time.

The subsequent operation is performed in a similar manner of the previously-described operation, and the duty signal (Sduty) becomes low at the times (T9, T10, T11) when the oscillator signal (OSC) becomes low, so the auxiliary switch M2 is turned off, and the main switch M1 is turned on after a predetermined dead time.

That is, according to the exemplary embodiment of the present invention, the auxiliary switch M2 is turned on from the time when the sense voltage (Vse) becomes equal to the feedback voltage Vfb to the time when the sense voltage (Vse) becomes less than the reference voltage (Vref) while the oscillator signal (OSC) is low. Then, the shoot-through current may not be generated.

According to an embodiment of the present invention, failure of shoot-through or zero voltage switching can be predicted and prevented. Therefore, damage to the converter caused by failure of shoot-through or zero voltage switching is prevented.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. In a device including a main switch and an auxiliary switch and controlling the main switch and the auxiliary switch in a converter for generating an output voltage by using a transformer, a switch controller comprising:
an oscillator for generating an oscillator signal;
a duty controller for generating a duty signal for controlling switching operations of the main switch and the auxiliary switch by using the oscillator signal, a result of comparing a signal corresponding to a primary coil current flowing at a primary coil of the transformer and a predetermined reference voltage, and a result of comparing a feedback voltage corresponding to the output voltage and the signal corresponding to the primary coil current, the duty controller increasing a turn-on time of the auxiliary switch by determining to turn off the auxiliary switch after a maximum turn-on duration of the auxiliary switch has elapsed based on the result of comparing the signal corresponding to the primary coil current and the predetermined reference voltage; and
a gate driver for generating first and second control signals for controlling switching operations of the main switch and the auxiliary switch by using the duty signal.

2. The switch controller of claim 1, wherein the duty controller determines when to turn on the main switch and turn off the auxiliary switch by using the oscillator signal and the result of comparing the signal corresponding to the primary coil current and the reference voltage, and the duty controller determines when to turn off the main switch and turn on the auxiliary switch by using a result of comparing a voltage of the signal corresponding to the primary coil current and the feedback voltage.

3. The switch controller of claim 2, wherein the duty controller sets the maximum turn-on duration of the auxiliary switch and, when the voltage of the signal corresponding to the primary coil current is greater than the reference voltage during the maximum turn-on duration, the duty controller turns off the auxiliary switch at a time moment after the maximum turn-on duration passes from when the auxiliary switch is turned on.

4. The switch controller of claim 3, wherein the duty controller includes an up-down counter for setting the maximum turn-on duration of the auxiliary switch.

5. The switch controller of claim 4, wherein the up-down counter increases a count value in response to the oscillator signal, and resets the count value by outputting a first pulse signal when the count value becomes greater than a predetermined value,
the auxiliary switch is turned off according to the first pulse signal, and
the maximum turn-on duration includes a time interval from when the count value is reset to before the first pulse signal is output.

6. The switch controller of claim 5, wherein the oscillator signal alternately has a first level and a second level, and
the duty controller turns off the auxiliary switch when the voltage of the signal corresponding to the primary coil current is less than the reference voltage when the oscillator signal is at the first level during the maximum turn-on duration.

7. The switch controller of claim 6, wherein the duty controller further includes:
a comparator for comparing the reference voltage and the voltage of the signal corresponding to the primary coil current and outputting a second pulse signal;
an inverter for outputting an inverted oscillator signal by inverting the oscillator signal; and
a first AND gate for outputting a fourth pulse signal by performing an AND operation on a third pulse signal corresponding to the second pulse signal and the inverted oscillator signal, and
the auxiliary switch is turned off in response to the fourth pulse signal.

8. The switch controller of claim 7, wherein the duty controller further includes:
a second AND gate for outputting a fifth pulse signal by performing an AND operation on the second pulse signal and the oscillator signal;
a delay unit for delaying the inverted oscillator signal; and
a first SR latch including a set terminal for receiving the fifth pulse signal and a reset terminal for receiving the delayed inverted oscillator signal, and generating the third pulse signal by using the fifth pulse signal and the inverted oscillator signal.

9. The switch controller of claim 7, wherein the duty controller turns off the main switch when the voltage of the signal corresponding to the primary coil current becomes equal to the feedback voltage.

10. The switch controller of claim 9, wherein the duty controller further includes a second comparator for outputting a fifth pulse signal by comparing the voltage of the signal corresponding to the primary coil current and the feedback voltage, and the main switch is turned off in response to the fifth pulse signal.

11. The switch controller of claim 10, wherein the duty controller further includes:
 a first OR gate for generating a sixth pulse signal by performing an OR operation on the first pulse signal and the fifth pulse signal;
 a second SR latch including a set terminal for receiving the sixth pulse signal and a reset terminal for receiving the oscillator signal, and generating a seventh pulse signal by using the sixth pulse signal and the oscillator signal; and
 a logic device for generating the duty signal by using the seventh pulse signal and the fifth pulse signal.

12. The switch controller of claim 11, wherein the logic device includes:
 a second inverter for generating an eighth pulse signal by inverting the seventh pulse signal;
 a third SR latch including an inverted output terminal, a reset terminal for receiving the fifth pulse signal, and a set terminal for receiving the eighth pulse signal, generating a ninth pulse signal by using the fifth pulse signal and the eighth pulse signal, and outputting the ninth pulse signal to the inverted output terminal; and
 an OR gate for generating the duty signal by performing an OR operation on the ninth pulse signal and the eighth pulse signal.

13. A converter comprising:
 a main switch for performing a switching operation in response to a first control signal;
 an auxiliary switch, connected between the main switch and a ground, for performing a switching operation in response to a second control signal having a different phase from the first control signal;
 a transformer including a primary coil and a secondary coil connected to an output end, and transforming an input voltage into an output voltage by the switching operations of the main switch and the auxiliary switch; and
 a switch controller for generating the first control signal and the second control signal by using a feedback voltage corresponding to the output voltage and a voltage of a signal corresponding to a current flowing to the primary coil, and increasing a turn-on time of the auxiliary switch to keep the auxiliary switch turned on by determining to turn off the auxiliary switch after a maximum turn-on duration of the auxiliary switch has elapsed when the voltage of the signal corresponding to the current flowing to the primary coil is greater than a reference voltage.

14. The converter of claim 13, wherein the switch controller turns off the main switch and turns on the auxiliary switch when the voltage of the signal corresponding to the current flowing to the primary coil becomes equal to the feedback voltage, and the switch controller turns off the auxiliary switch and turns on the main switch when an oscillator signal is at a first level and the voltage of the signal corresponding to the current flowing to the primary coil becomes less than a reference voltage.

15. The converter of claim 14, wherein the switch controller sets the maximum turn-on duration of the auxiliary switch, and turns off the auxiliary switch in correspondence to the maximum turn-on duration of the auxiliary switch when the voltage of the signal corresponding to the current flowing to the primary coil is greater than the reference voltage during the maximum turn-on duration.

16. The converter of claim 15, wherein the switch controller includes an up-down counter for increasing a count value in response to the oscillator signal, and resetting the count value by outputting a first pulse signal when the count value is greater than a predetermined value, and the auxiliary switch is turned off in response to the first pulse signal.

17. The converter of claim 16, wherein the maximum turn-on duration includes a time interval from after when the count value is reset till to before the first pulse signal is output.

18. The converter of claim 16, wherein the switch controller further includes:
 an oscillator for generating the oscillator signal;
 a first comparator for generating a second pulse signal by comparing the voltage of the signal corresponding to the current flowing to the primary coil and the reference voltage; and
 a logic device for outputting a third pulse signal by using the oscillator signal and the second pulse signal, and the auxiliary switch is turned off and the auxiliary switch is turned on in response to the third pulse signal.

19. The converter of claim 18, wherein the logic device includes:
 a first AND gate for generating a fourth pulse signal by performing an AND operation on the second pulse signal and the oscillator signal; and
 a second AND gate for generating the third pulse signal by performing an AND operation on the fourth pulse signal and a signal for inverting the oscillator signal.

20. The converter of claim 18, wherein the switch controller further includes a second comparator for generating a fourth pulse signal by comparing the voltage of the signal corresponding to the current flowing to the primary coil and the feedback voltage.

21. The converter of claim 20, wherein the switch controller further includes:
 a first SR latch including an output terminal, a set terminal for receiving the first pulse signal or the second pulse signal, and a reset terminal for receiving the oscillator signal, latching the first pulse signal or the second pulse signal to generate a fifth pulse signal, and outputting the fifth pulse signal to the output terminal;
 an inverter for generating a sixth pulse signal by inverting the fifth pulse signal;
 a delay unit for delaying the sixth pulse signal;
 a second SR latch including an inverted output terminal, a set terminal for receiving the delayed sixth pulse signal, and a reset terminal for receiving the fourth pulse signal, latching the sixth pulse signal to generate a seventh pulse signal, and outputting the seventh pulse signal to an inverted output terminal; and
 an OR gate for generating an eighth pulse signal by performing an OR operation on the sixth pulse signal and the seventh pulse signal, and the main switch is turned off and the auxiliary switch is turned on by using the eighth pulse signal.

* * * * *